Figure 1:
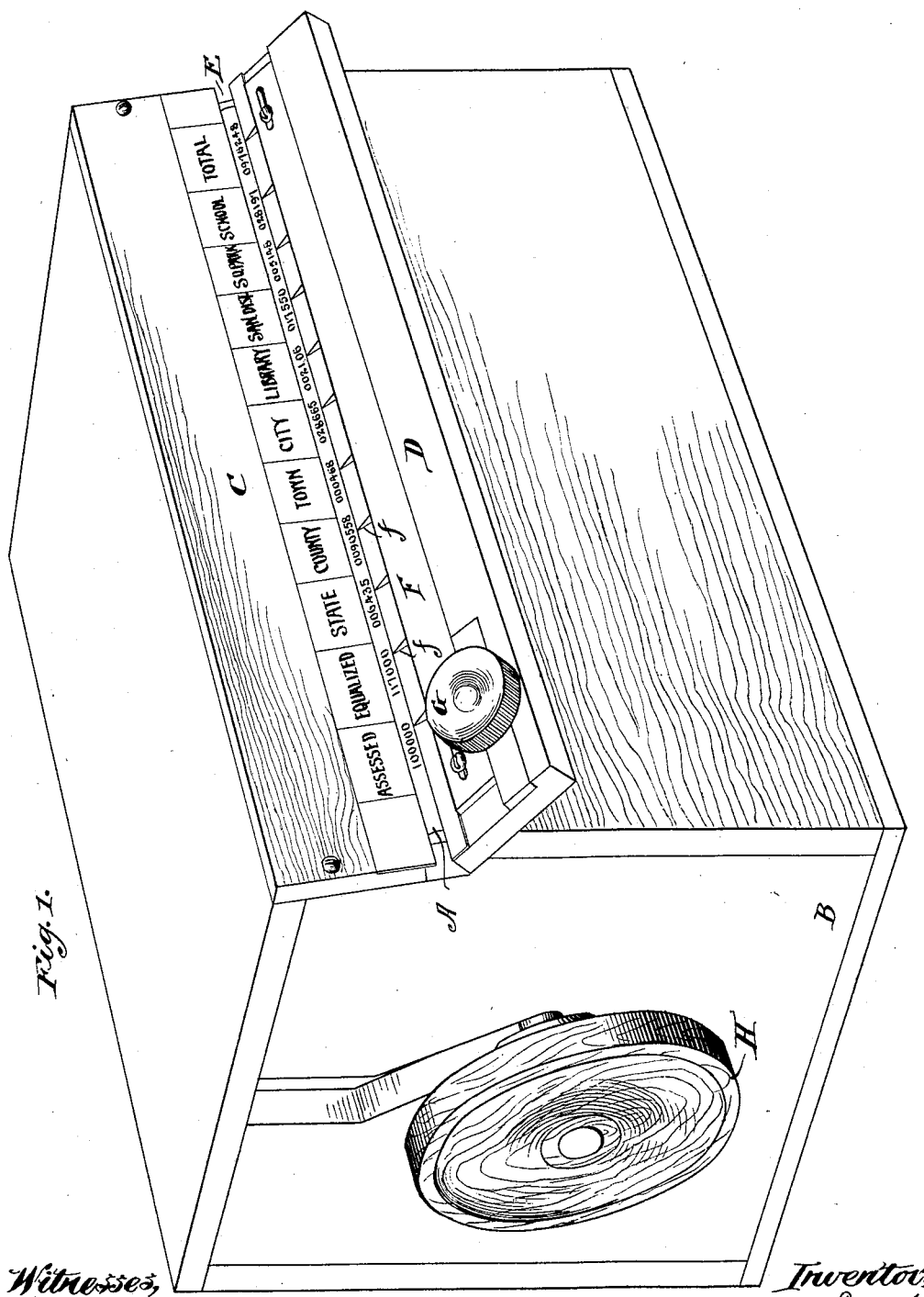

No. 614,850. Patented Nov. 29, 1898.
W. A. DRAKE.
ARITHMETICAL CALCULATOR.
(Application filed Nov. 8, 1897.)
(No Model.) 3 Sheets—Sheet 1.

Witnesses,
L. B. Mann
Frederick L. Goodwin

Inventor,
Warren A. Drake,
By Offield, Towle & Linthicum,
Attys.

No. 614,850. Patented Nov. 29, 1898.
W. A. DRAKE.
ARITHMETICAL CALCULATOR.
(Application filed Nov. 8, 1897.)
(No Model.) 3 Sheets—Sheet 2.
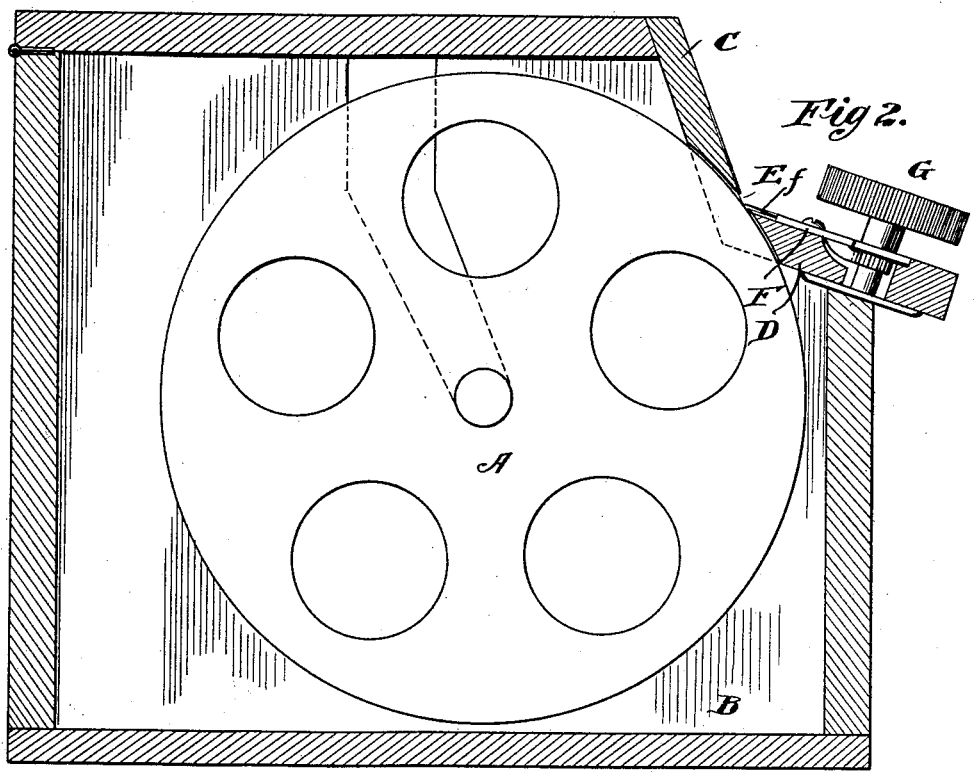
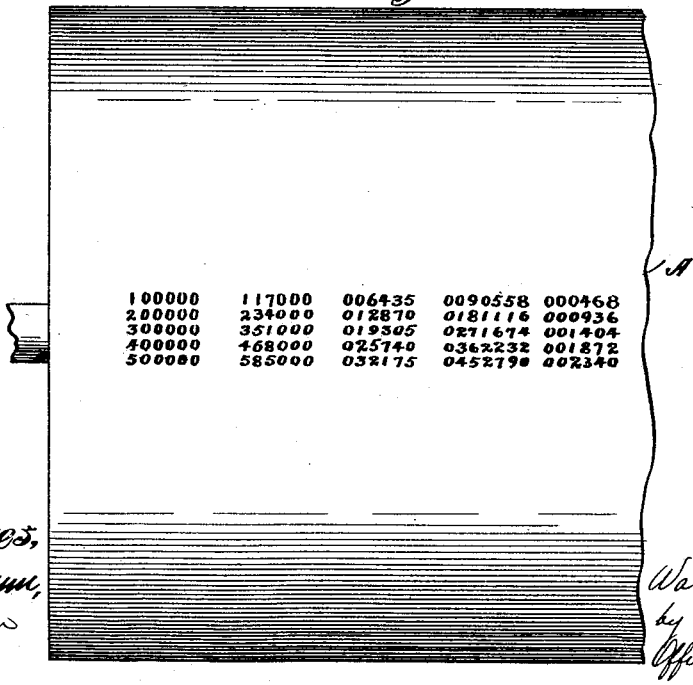

No. 614,850. Patented Nov. 29, 1898.
W. A. DRAKE.
ARITHMETICAL CALCULATOR.
(Application filed Nov. 8, 1897.)
(No Model.) 3 Sheets—Sheet 3.
Fig. 4.
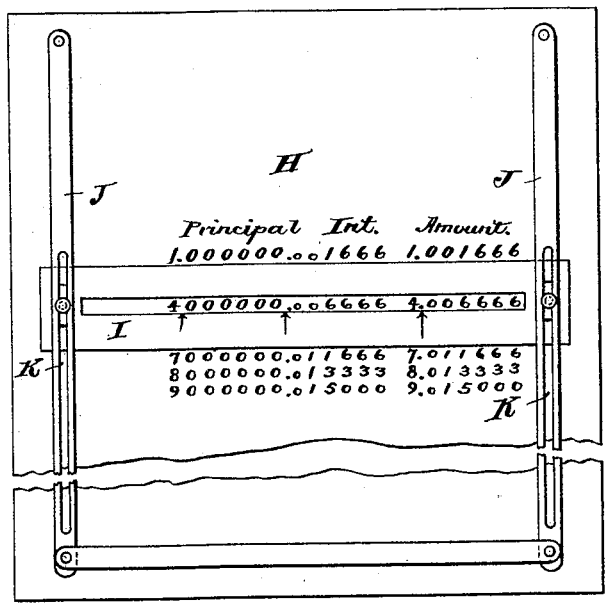
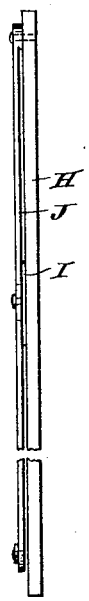
Fig. 5.
Fig. 6.
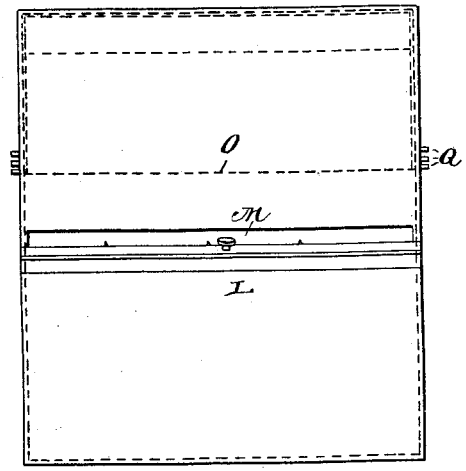
Fig. 7.
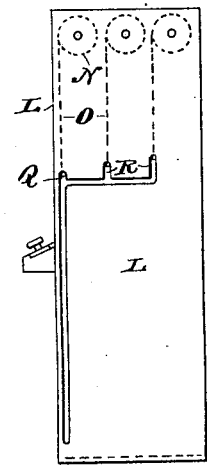
Fig. 8.
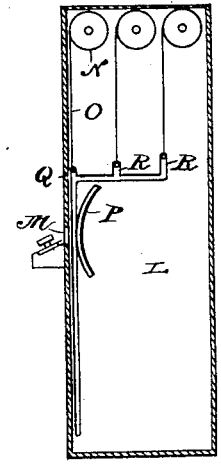
Witnesses,
Inventor,
Warren A. Drake,

UNITED STATES PATENT OFFICE.

WARREN A. DRAKE, OF CHICAGO, ILLINOIS.

ARITHMETICAL CALCULATOR.

SPECIFICATION forming part of Letters Patent No. 614,850, dated November 29, 1898.

Application filed November 8, 1897. Serial No. 657,780. (No model.)

*To all whom it may concern:*

Be it known that I, WARREN A. DRAKE, of Chicago, in the county of Cook and State of Illinois, have invented certain new and useful Improvements in Arithmetical Calculators, of which the following is a specification.

The general object of my invention is to simplify arithmetical calculations by providing certain means or instrumentalities to be used in connection with tables of figures.

My improvements are applicable to the decimal system of notation, and the apparatus which I have employed I have designated generally as the "Autodecigraph."

The principle of my invention is adapted to a variety of uses, and the apparatus used in connection therewith may be embodied in a variety of structural forms.

I have selected for the purposes of illustration certain tables which are employed in extending taxes, and the apparatus shown in the accompanying drawings is well adapted for use in the carrying out of this work.

I will first explain briefly the method commonly employed in extending taxes, and then by reference to the accompanying drawings show the applicability of my improvements thereto and by comparison the saving in labor which my invention accomplishes.

In the levying of taxes there are two prime factors—namely, the total amount of tax to be raised and the total value of the property subject to taxation. Obviously the percentage which the amount of tax required bears to the total valuation of the taxable property gives the tax-rate; but as in most systems of government the total amount of tax is subdivided and specifically appropriated for different uses—such as state, county, town, city, school, park, library, &c.—repeated applications of the rate to the valuation of the several parcels of property must be made and the amounts separately noted in order to keep each item of taxation separate. A tax-roll or warrant, therefore, usually consists of a sheet transversely lined and vertically ruled into columns, at the left of the sheet the name of the owner and description of the property being entered, and following the description are columns with proper headings for the "assessed" valuations, both as originally laid by the assessor and by the county or other board of equalization, and the equalized valuation as fixed by the State board of equalization, and the remaining columns being headed with the different divisions or items for which taxes are levied. The rate being determined the amounts of the several items are ascertained by applying this rate to the valuation of each specific item of property. To assist in this work, it is common to employ tables which are made up similar to interest-tables, except that usually some of the sheets—as, for example, in the higher numbers, running by thousands—say, from 10,000 to 1,000,000—are provided with blank columns in which the percentages are written down for each separate item of tax, these percentages being erased when the table is to be used for computing the tax for another or different purpose. Thus there may be as many as ten different items found upon the same tax-roll or warrant, and the table must be revised for each item. In using these tables a series of additions must be gone through with in order to ascertain the exact amount of the tax upon any given piece of property for each particular item—as, for example, if the valuation of a parcel is twenty-one thousand seven hundred and sixty-two dollars the rate must be applied to this valuation, and the tables are used by taking the amount, first, of twenty thousand dollars, next of seventeen hundred dollars, next of sixty dollars, and last of two dollars, and these four separate amounts, being added together, give the amount of the tax for one specific purpose. Obviously the same operation must be repeated to ascertain the respective amounts chargeable against this one parcel for the various purposes for which taxes are laid, and the total amount of the tax must be ascertained by adding together the several items. This same operation is repeated for each parcel of land, and each valuation must be returned to as many times as there are distinct items of taxation. Thus, in brief, to extend the taxes on a single page of the tax-roll may require the making of several thousand figures, the performance of a large number of additions, and the reconstruction or revision of the tables used as many times as there are distinct items of taxation.

I will next proceed to describe the manner in which my invention may be employed to shorten the labor and to avoid the numerous errors which frequently creep into the work. The instrumentalities which I employ comprise a table of figures and an indicator, hereinafter called a "decimal-bar," said table and said bar being capable of relative movement, so that any line of the table may be brought adjacent to the bar, and the table and bar having also a transverse relative movement, so as to vary upon a decimal-scale the values expressed by their juxtaposition.

In the accompanying drawings, Figure 1 is a perspective view of one of my calculators adapted to the purpose of the extension of taxes. Fig. 2 is a transverse sectional elevation of the same. Fig. 3 is a broken section of a cylinder or table-carrier, showing tabulated numbers thereon. Figs. 4 to 8, inclusive, show modifications of the form of the apparatus.

In carrying out my invention I place upon a revolving cylinder A a compilation or tabulation of numbers, these numbers being arranged in vertical columns and transverse parallel lines. This cylinder is mounted within a suitable casing, as B, having a cover C, whose front edge terminates above the shelf D, so as to provide a sight-opening, as at E. Mounted to slide in ways upon said shelf is a bar F, which is hereinafter designated the "decimal-bar," having pointers $f$, one for each vertical column of numbers. A milled wheel G affords means for shifting the decimal-bar in its ways, while a similar contrivance H, exterior to the casing, affords means for rotating the cylinder upon its axis. Upon the front of the hinged cover and arranged in line with the several columns of numbers upon the cylinder are marked appropriate headings—as, for example, the words "assessed," "equalized," &c., these words being adjacent to and immediately above the sight-openings.

The above is a brief description of all of the apparatus required for carrying out my invention. In the compilation of the table the left-hand column of figures contains the assessed valuation of the property and will appear opposite the sight-opening, underneath the word "assessed," said column of figures being carried entirely around the periphery of the cylinder and including a series of numbers beginning with "1" and followed by a series of ciphers. In the next column the equalized valuation is shown, while in successive columns are indicated the tax upon one dollar for the several purposes for which the taxes are levied, and in the right-hand column the total amount of tax appears. Now assuming that the decimal-bar is placed so that the pointer F indicates one unit in the first column, it is a matter of calculation to determine the amounts to be placed in the succeeding columns in line with this unit, while in the next line below, which begins with "2," will appear the several items, the amounts being, respectively, twice as large as in the first line, and so on throughout the table. Now assuming that the apparatus be set so as to show "$1.00" under the heading "assessed," this amount will be understood to mean the original valuation of the parcel in question, while the pointer under the column "equalized" will indicate a different amount, showing the equalized valuation, and in successive columns will appear the tax upon one dollar at the equalized valuation for each specific purpose and in the right-hand column the total amount of tax on one dollar for all purposes. If now the assessed valuation of the parcel be ten thousand dollars, as indicated in Fig. 1 of the drawings, and the equalized valuation eleven thousand seven hundred dollars, the tax for State purposes at the assumed rate of fifty-five cents on one hundred dollars will be $64.35; for county purposes, $90.55.8; for town purposes, $4.68; for city purposes, $286.65; for library purposes, $21.06; for sanitary district purposes, $175.50; for South Park purposes, $51.48; for school purposes, $281.97, and the total amount of the tax, $976.24.8. Obviously by simply shifting the decimal-bar the amount of tax for each of the several purposes on one dollar, ten dollars, one hundred dollars, one thousand dollars, ten thousand dollars, or one hundred thousand dollars may be instantly ascertained. Suppose, however, that the assessed valuation were represented by some number beginning with "3." The cylinder would then be rotated so as to bring the third row of figures opposite the sight-opening, whereupon would appear under the heading "assessed" the numeral "3" followed by a series of ciphers, and by shifting the decimal-bar as before the amount of tax for each particular item on three dollars, thirty dollars, three thousand dollars, &c., could be readily ascertained. The same principle of course would apply to the extension of the tax upon any sum beginning with any of the numbers between "1" and "999," assuming the table to be so constructed, and by shifting the decimal-bar the amounts might be readily found upon the numbers which are multiples of ten, running from "1" to "99,900,000," and without any additions or calculations. Taking now, for example, the same number which was used in illustrating the common method of extending taxes—namely, twenty-one thousand seven hundred and sixty-two dollars—as the equalized valuation of a piece of property, the cylinder would be turned until the number beginning with "217" appears. Then by shifting the decimal-bar two places to the right the number "21,700" is indicated and the amounts of the several items of tax thereon appear under appropriate headings in line with the said number properly pointed off, as the several pointers perform equal movements, and these amounts are noted. Then by turning the cylinder to the number beginning with "62," the amounts of the tax for several items on sixty-two dollars will be likewise indicated, and by addition of these amounts with those previously noted each item of tax is ascertained, thus saving two additions under each item of tax as compared with the common method first explained.

It will be observed from the foregoing statements that the use of the apparatus with the particular number taken for illustration saves two additions, but requires one addition, thus failing to indicate mechanically the ultimate or desired sums.

I have above used the headings "assessed" and "equalized" and will now briefly explain in what manner my apparatus may be used to find the equalized valuation and the proper amount of taxes under each item. The assessed valuation is that which is fixed by the assessor or tax-levying officer. The equalized valuation is the amount of the assessed valuation plus or minus a certain percentage, generally fixed by a governing board or body. As assessed valuations are almost invariably made in even tens of dollars, fractional parts of a dollar and sums less than ten dollars being omitted in the estimate, the addition or subtraction of a certain percentage from these assessed valuations necessarially results in producing odd numbers and numbers ending in significant figures. Thus, for example, take the illustration shown in Fig. 1, showing the assessed valuation to be ten thousand dollars. The equalized valuation, seventeen per cent., being added, shows eleven thousand seven hundred dollars, and the rate for each item of taxation I increase by seventeen per cent. and then extend the taxes or make the computation upon the assessed instead of the equalized valuation, thus dealing with the column of figures which ends in even tens. For example, if the assessed valuation be eighteen thousand six hundred dollars the equalized valuation (seventeen per cent. added) will be twenty-one thousand seven hundred and sixty-two dollars. If the taxes be extended on the latter amount according to the foregoing illustration by the old method, four additions are necessary. If extended by my apparatus according to the latter illustration, one addition would be necessary, but if extended on eighteen thousand six hundred dollars, the original valuation at the rate, increased by seventeen per cent., no addition whatever is necessary, because by turning the cylinder to the number beginning with the digits "186" the equalized valuation appears in its appropriate column and the amounts of the several items are extended in line, requiring only to be transcribed upon the roll. Thus it will be seen that this method of tabulation, whereby the percentage for equalization is applied to the rate or multiplier instead of to the amount or multiplicand, coördinates with the system of decimal notation carried out by the aid of the apparatus, and the amounts of the several items of taxation upon any number of dollars are equalized. To sum up, with my apparatus any assessed valuation having not more than three successive significant figures, followed by any number of naughts or ciphers, may be equalized and the amounts of the several items of tax indicated without any addition whatever.

To give a further idea of the saving effected by my apparatus, I may say that the calculator shown in the drawings has a cylinder ten inches in length and five inches in diameter and is adapted for use in the extension of eight distinct items of taxation, showing also the assessed and equalized valuations and the total amount of tax on amounts commencing with the numbers from "1" to "150," inclusive, and will, by the aid of the shifting decimal-bar, show the like items on any number of even tens from "10" to "100,000."

In Figs. 4 to 8, inclusive, I have shown certain modifications of the forms of instrumentalities employed in carrying out my invention. For example, in Fig. 4 let H represent a sheet of cardboard having delineated thereon three columns of figures, which may be taken to represent principal, interest, and amount. I represents a decimal-bar having pointers and its central portion cut away, so as to expose a single row of figures. To the ends of the bar are pivotally connected swinging parallel links or arms J, provided with longitudinal slots K, these links being pivotally connected together at one end and pivotally mounted upon the sheet at the opposite end. Obviously with this simple mechanism the numbers in the first column may be taken to represent the principal, the numbers in the second column interest, and the numbers in the third column the amount or the principal plus the interest. The table of course in this case would be calculated with reference to a definite rate and time and the interest and amount of any number of dollars represented by a single significant figure, and any number of ciphers may be found by the mere shifting of the decimal-bar. Thus in the example shown in Fig. 4 the table is computed to show the interest accruing monthly at the rate of two per centum per annum, and the interest on four dollars for one month at that rate is represented by the decimal "$.0066+" and the amount "$4.006+."

A simple apparatus of this kind would be available for use in computing interest in savings banks and in other instances where the rate and time are constant. Of course it will be seen that where a large number of figures are to be handled the sheet might be made movable and the decimal-bar also movable, but only transversely with reference to the sheet.

In the form of construction shown in Figs. 6, 7, and 8 I show a casing (marked L) having a sight-opening M, with a sliding decimal-bar arranged with its edge adjacent and parallel thereto and provided with the usual pointers. Within the casing are mounted a series of cylinders or rollers N, which may be spring-actuated and mounted upon said rollers a series of flexible curtains O, having delineated thereon tables or portions of tables. Within the casing is a curved plate P, so arranged as to hold the several curtains in convenient relation to the sight-opening. Said curtains have rods Q in their lower ends, and said rods are guided by grooves R, so that each curtain may be drawn down between the curved plate P and the sight-opening, so as to expose the numbers of the tables thereon. In this simple form of apparatus an extended surface is provided in a simple and inexpensive form.

This and other structural modifications will readily suggest themselves to the constructor when the principle of my invention is understood, and they are explained as illustrative merely.

I make no claim in the present application to the specific subject-matter set forth in an application filed by me, of even date herewith, for "Improvement in arithmetical calculators," bearing the Serial No. 657,779, the subject-matter of which consists, essentially, in the combination, with a decimal-bar having pointers, of a plurality of rotatable supports or cylinders having numbers tabularly arranged thereon, and a decimal-bar having pointers, said supports being rotatable upon their own axes and bodily movable relatively to the decimal-bar.

I also make no claim in the present application to the specific subject-matter set forth in an application filed by me of even date herewith, for "Improvements in interest-calculators" and bearing the Serial No. 657,781, the substance of the subject-matter of said application being an interest-calculator comprising a suitable support having an interest-table thereon and a decimal-bar relatively movable with respect to each other, the decimal-bar having pointers independently movable thereon.

I claim—

1. An arithmetical calculator comprising, in combination, a suitable backing or support having numbers arranged thereon in columns and a decimal-bar having fixed pointers, said support and said bar and pointers being capable of relative movement, whereby the values expressed by the numbers in the various columns may be correspondingly and decimally increased or decreased, substantially as described.

2. An arithmetical calculator comprising, in combination, a suitable backing or support having arranged thereon a plurality of numbers, and a decimal-bar consisting of or having a plurality of pointers in fixed relations to each other, said support and said bar or pointers having relative movement, whereby the value of the numbers may be increased or decreased in a tenfold ratio, substantially as described.

3. An arithmetical calculator, comprising in combination, a suitable backing or support having delineated thereon, a plurality of columns of numbers and a decimal bar or indicator having pointers arranged thereon and connected so as to be movable simultaneously and through equal distances, whereby any number or row of numbers may be brought adjacent to said bar and said pointers moved to increase or decrease the value of the numbers expressed in a tenfold ratio, substantially as described.

4. An arithmetical calculator comprising, in combination, a movable backing or support having numbers arranged thereon in parallel columns, and a decimal-bar arranged and movable at right angles to said columns and having a pointer for each column of figures, substantially as described.

5. An arithmetical calculator comprising in combination a rotatable cylinder having delineated and arranged thereon in tabular form, a series of numbers and a decimal-bar having pointers, one for each column of figures, and whereby the rotation of the cylinder may be made to bring any row of numbers into juxtaposition to the decimal-bar and by the movement of the latter along said row, the value of the numbers expressed may be increased or diminished in a tenfold ratio, substantially as described.

6. An arithmetical calculator, comprising in combination, a suitable casing or support having a sight-opening therein, a revoluble cylinder mounted within said casing and having numbers delineated and arranged in parallel columns and rows thereon, a decimal-bar mounted to slide in suitable ways adjacent to said sight-opening and said bar having pointers thereon for each column of figures, substantially as described.

7. An arithmetical calculator, comprising in combination, a suitable casing, a cylinder rotatably mounted therein, a sight-opening in the wall of said casing, a shelf arranged upon the casing adjacent to said sight-opening and having ways thereon, a decimal-bar mounted to slide in said ways, a series of headings arranged upon the casing above the sight-opening, and a series of numbers arranged upon the cylinder in parallel circumferential columns and transverse rows, said decimal-bar having a plurality of pointers, one for each column, and whereby said numbers may be indicated or pointed off, according to the decimal system of notation, substantially as described.

WARREN A. DRAKE.

Witnesses:
 FREDERICK C. GOODWIN,
 S. T. MANN.